United States Patent [19]

Stalker

[11] 4,217,978
[45] Aug. 19, 1980

[54] PRECISE PALLET LOCATING AND CLAMPING ARRANGEMENT FOR WORKPIECE TRANSFER MECHANISM

[75] Inventor: Neil J. Stalker, Clarkston, Mich.

[73] Assignee: F. Jos. Lamb Company, Warren, Mich.

[21] Appl. No.: 957,482

[22] Filed: Nov. 3, 1978

[51] Int. Cl.² .................................................. B65G 25/02
[52] U.S. Cl. ...................................... 198/345; 198/472
[58] Field of Search ............... 198/345, 472, 648, 773, 198/774; 414/750

[56] References Cited

U.S. PATENT DOCUMENTS

| | | | |
|---|---|---|---|
| 3,888,341 | 6/1975 | Konkal et al. | 198/345 |
| 3,968,869 | 7/1976 | Stalker | 198/345 |
| 4,095,687 | 6/1978 | Shoiket | 198/345 |
| 4,148,400 | 4/1979 | Cross | 198/345 X |

FOREIGN PATENT DOCUMENTS 979841 12/1975 Canada ...................................... 198/345

*Primary Examiner*—James L. Rowland
*Attorney, Agent, or Firm*—Barnes, Kisselle, Raisch & Choate

[57] ABSTRACT

A workpiece transfer mechanism having a plurality of successive stations each provided with a fixture for locating and clamping a workpiece supporting pallet in a precise position for performing a machining operation on the workpiece. The transfer mechanism is of the lift and carry type so that the pallets are transported with a minimum amount of sliding wear on the locating surfaces. The precise location of the pallet is obtained by two clamping mechanisms.

14 Claims, 9 Drawing Figures

PRECISE PALLET LOCATING AND CLAMPING ARRANGEMENT FOR WORKPIECE TRANSFER MECHANISM

This invention relates to a workpiece transfer mechanism and, more particularly, to a pallet locating and clamping fixture.

In machining numerous types of workpieces it is common practice to mount the workpieces on a pallet and index the workpieces through successive stations by sliding the pallets on supporting rails. With such arrangements it is usually necessary to employ at each station a fixture for locating and firmly clamping the pallet in a predetermined position. The locating means for positioning the pallet at a precise location longitudinally of the rails on which it slides usually comprise at least two shiftable shot pins on each fixture adapted to be projected into locating bores on the pallet. The clamping means usually comprise two pairs of clamps adapted to engage the feet on the pallet and clamp the pallet firmly against the rails.

The above described locating and clamping arrangement has serious deficiencies when utilized for machining workpieces requiring extreme precision. The locating shot pins engaging the bores of the pallet must, by necessity, have some degree of diametrical looseness to permit them to be shifted to engage in the pallet bores. This initial looseness is not conductive to precise location of the pallet and, when added to the diametrical wear on the shot pins and bores encountered in normal service, renders the apparatus incapable of performing its intended purpose. The vertical location of the workpiece is determined to a large extent by the integrity of the pallet feet clamped to the transfer rails. These pallet feet support the weight of the pallet and workpiece and slide on the transfer rails. As a consequence, the pallet feet are subjected to a substantial amount of wear during transfer from station to station. Over a period of time this wear affects the vertical location of the workpiece to an extent such that reliable precise machining operations on the workpiece are impossible.

The primary object of this invention is the provision of a pallet locating and clamping mechanism that precisely locates the work-holding pallets on the station fixture with a minimum of wear of the locating surfaces.

Another object of the invention is to employ clamping arrangements which simultaneously locate and clamp the pallet in a predetermined position on the station fixture.

A further object of the invention is to eliminate the problem of wear on the locating surfaces of the pallet by transferring the pallet from one station to the next without sliding contact of the working surfaces.

The aforementioned objects are achieved by utilizing a workpiece transfer mechanism wherein the pallet does not slide from one station to the next but is lifted vertically from the pallet locating fixture at each station by a pair of transfer bars, carried by the transfer bars to the next station, and the lowered by the transfer bars onto the fixture at the next station.

In the preferred embodiment the transfer bars are substantially square in cross section and are oriented so that one diagonal of the cross section is vertical. V-shaped notches on the under side of the pallet are designed to be engaged by the transfer bars. When the transfer bars are in their lowered position and the pallet is supported on a station fixture, the V-shaped notches on the pallets are slightly laterally misaligned with the transfer bar so that, when the transfer bars are raised to lift the pallet before transfer, the pallet is displaced laterally slightly so as to eliminate interference between the pallet and the longitudinal clamping mechanism. After the pallet has been transferred, the transfer bars are lowered to deposit the pallet on the next station fixture in an at least slightly laterally displaced position. Thereafter, the main clamping mechanism is actuated to displace the pallet laterally into its final working position. The two clamping mechanisms secure the pallet both laterally and longitudinally along two perpendicular axes. The third axis of movement, namely the vertical axis, is obtained by an angular gib engagement between the pallet and the fixture. During clamping, unclamping and transferring of the pallet from one station to the next all sliding contact of the locating surfaces is maintained at a minimum so that the accuracy of the apparatus is not destroyed.

Further objects, features and advantages of the present invention will become apparent from the following description and accompanying drawings, in which.

Figure 1:
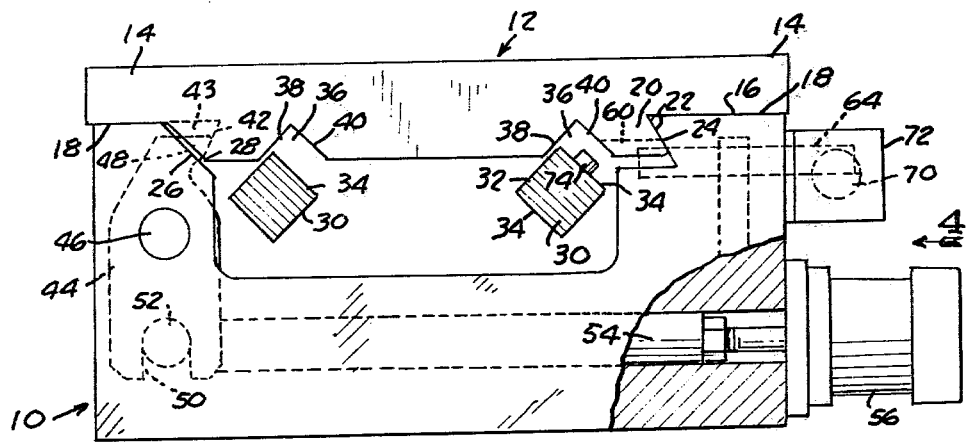
FIG. 1 is an end view of a fixture at a station with a work-supporting pallet clamped thereon at a precise location.
Figure 2:
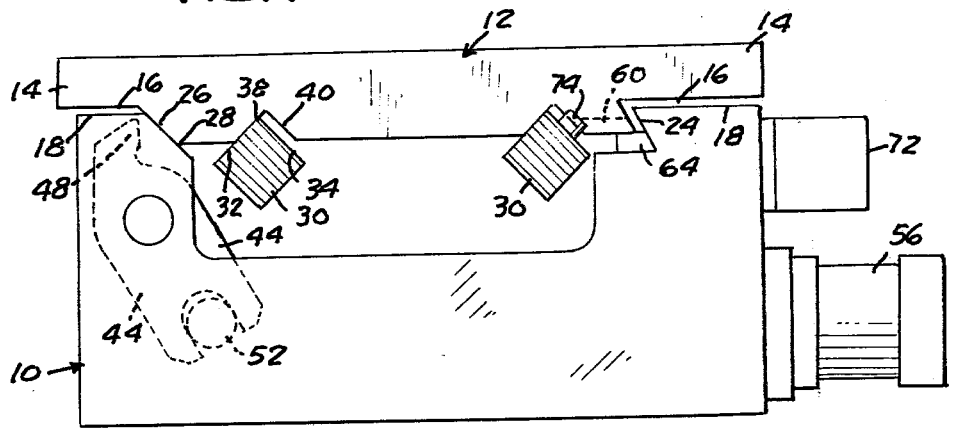
FIG. 2 is a view similar to FIG. 1 showing the clamps released and the pallet partially raised by the transfer bars.

In FIG. 1 there is shown one station of a workpiece transfer mechanism which includes a fixture 10 on which a pallet 12 is located and clamped in a precise position. Pallet 12 has pallet feet 14 along its lateral edges provided with accurately machined flat locating surfaces 16. In the clamped position of the pallet the surfaces 16 are in coplanar engagement with corresponding horizontal flat locating surfaces 18 on the fixture 10. Adjacent one of the locating surfaces 16 pallet 12 has a downwardly and laterally outwardly projecting angular gib 20. The laterally outer side of gib 20 comprises an accurately machined inclined flat face 22 which extends lengthwise of the pallet. The fixture has a correspondingly inclined flat surface 24 adapted to be engaged by the flat surface 22 of the pallet. In the embodiment illustrated in FIGS. 1 through 5 the opposite lateral side of the fixture has machined thereon a pair of coplanar inclined flat faces 26 and the under side of the pallet has correspondingly inclined flat faces 28 at the front and rear ends thereof. The faces 26,28 extend longitudinally and are inclined to the vertical at a greater angle than the surfaces 22,24.

The workpiece transfer mechanism includes two transfer bars 30 which are preferably of square cross section. Transfer bars 30 are oriented so that one diagonal thereof extends vertically. In other words, the top faces of transfer bars 30 comprise two angular faces 32,34. The under side of the pallet is formed with two V-shaped notches 36 having angled faces 38,40 adapted to interfit with the angular faces 32,34 on the transfer bars. Faces 32,38 are generally parallel to faces 26,28. Notches 36 are spaced apart laterally the same distance as transfer bars 30. However, as shown in FIG. 1, in the clamped position of the pallet notches 36 are displaced laterally in a direction toward the right relative to transfer bars 30.

On the under side of the pallet adjacent the side thereof laterally opposite angular gib 20 the pallet is formed with a pair of additional inclined faces 42 in notches 43. Faces 42 are inclined upwardly and inwardly in a direction opposite to the inclination of the surface 22. At the side of the fixture corresponding to the inclined faces 42 on the pallet two clamps 44 are pivotably supported on a pin 46. The upper end of each clamp 44 is formed with a nose which, when the clamps are actuated, are adapted to engage with faces 42 to apply a laterally inward and downward force on the pallet. The lower end of each clamp is slotted as at 50 to engage with the rounded ends 51 of an equalizing bar 52. Adjacent the center thereof equalizing bar 52 is connected to a push rod 54 connected to a cylinder 56.

Figure 4:
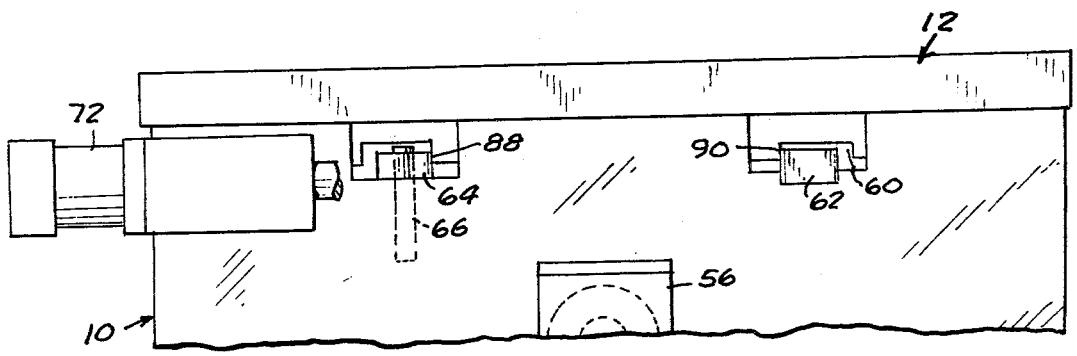
FIG. 4 is a fragmentary side view of the fixture and pallet as seen in the direction of the arrow 4 in FIG. 1.
Figure 5:
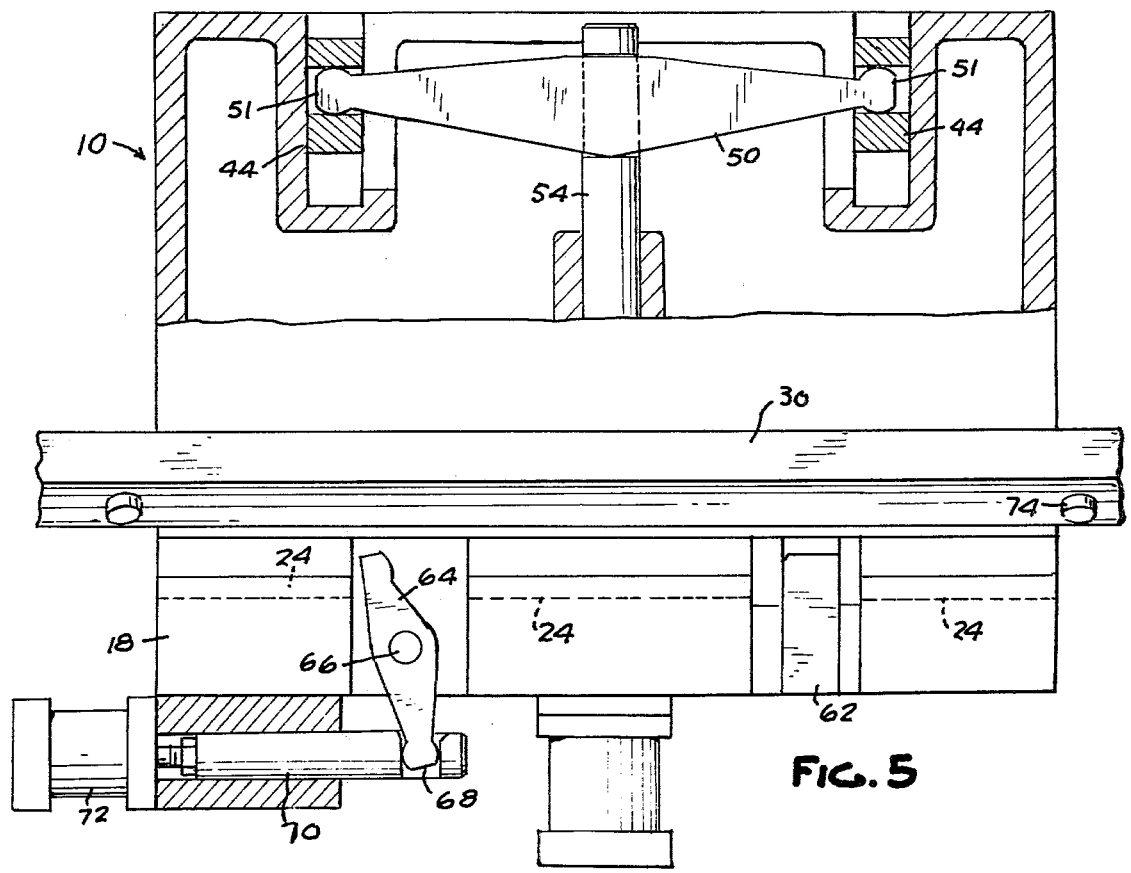
FIG. 5 is a plan view of the fixture, with portions broken away.

As shown in FIG. 4, two downwardly facing slots 60 are formed on the under side of the pallet in longitudinally spaced relation. When the pallet is deposited on the fixture by lowering transfer bars 30 a stop key 62 on the fixture is disposed within one of the slots 60 and a clamp crank 64 is disposed within the other slot 60. Crank 64 is pivotally mounted on a pin 66 and has one end thereof engaged with a notch 68 of a rod 70 actuated by a cylinder 72. At least one of the transfer bars 30 is provided with a plurality of stop buttons 74 spaced longitudinally thereof and adapted to engage the front and rear edges of a pallet to properly locate the pallet on the transfer bars when the pallets are raised and transferred.

Figure 6:
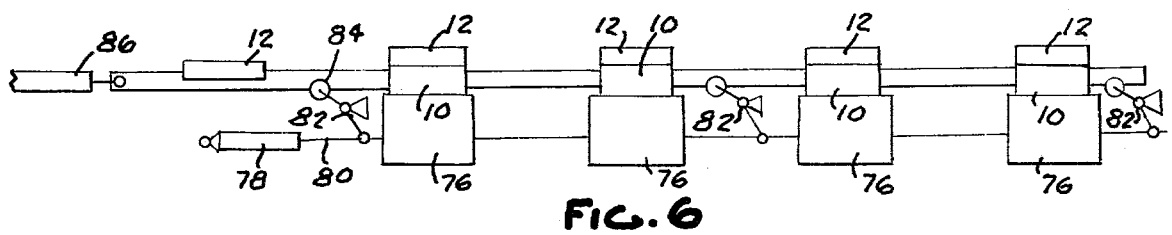
FIG. 6 is a diagrammatic view of a transfer mechanism incorporating the present invention.
Figure 7:
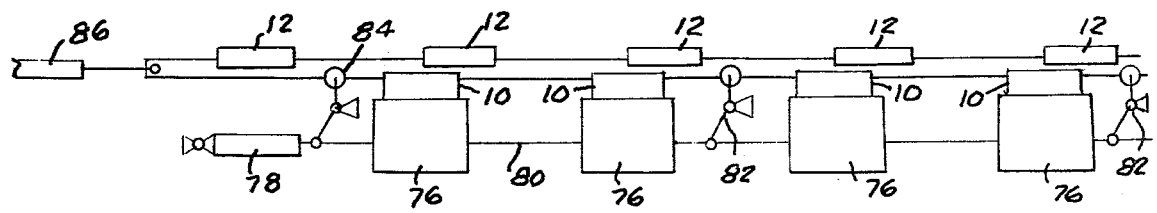
FIG. 7 is a view similar to FIG. 6 and showing the pallets lifted and being transferred to the next successive stations.

Referring now to FIG. 6, a transfer mechanism embodying the present invention is diagrammatically illustrated as having a plurality of station bases 76 equally spaced along the line of transfer. A fixture 10 is fixedly mounted on each base 76. A cylinder 78 is connected to a power bar 80 which is in turn connected to a plurality of bell cranks 82. The transfer bars 30 are supported on rollers 84 at the upper ends of bell cranks 82. A cylinder 86 is connected to the two transfer bars and is adapted to reciprocate them longitudinally.

When the pallets 12 are located in clamped position on the fixtures 10 as shown in FIG. 1 the transfer bars 30 are in the lowered position and surfaces 16, 18 are in coplanar engagement. Just prior to the actuation of cylinders 56,72, faces 26,28 are in coplanar engagement and surfaces 22,24 are spaced apart slightly. When cylinder 56 is actuated clamps 44 are pivoted in a clockwise direction as viewed in FIG. 1 so that the nose portions 48 thereof engage the inclined faces 26 on the pallet and shift the pallet to the right. This displacement causes the surfaces 22 at the opposite side of the pallet to move into firm coplanar engagement with the inclined surface 24 on the fixture. Thus, the flat locating surfaces 16 on the under side of the pallet are urged downwardly into firm coplanar engagement with the flat locating surfaces 18 on the fixture so that the vertical and lateral position of the pallet is precisely established when surfaces 22,24 are urged into coplanar engagement. Cylinder 72 is actuated simultaneously with cylinder 56 so that clamp 64 abuts shoulder 88 provided by the side wall of one of the slots 60 on the under side of the pallet and displaces the pallet slightly longitudinally so that the shoulder 90 formed by the side wall of the other slot comes into firm abutting engagement with stop key 62 on the fixture. This locates the pallet precisely in a longitudinal direction.

Figure 3:
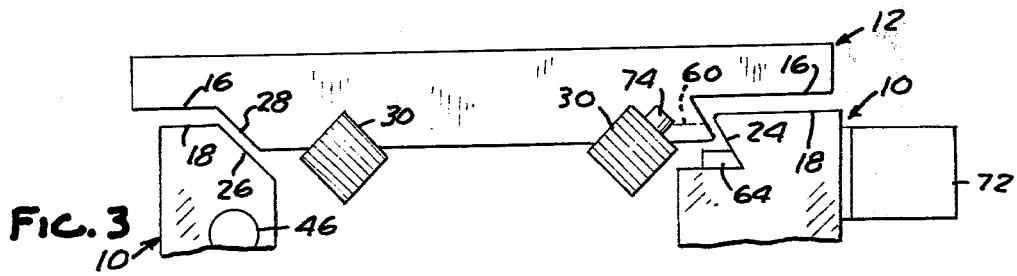
FIG. 3 is a fragmentary view similar to FIG. 2 and showing the pallet in the fully raised position.

When it is desired to transfer the pallets to the next successive stations clamps 44,64 are released and cylinder 78 is then actuated to raise the transfer bars from the position shown in FIG. 1 to that shown in FIG. 3. After the transfer bars 30 have been raised slightly the inclined faces 32 thereof engage the inclined faces 38 of the notches 36 and displace the pallet 12 horizontally to the left as viewed in FIG. 2. This causes the inclined faces 28 on the under side of the pallet to engage the inclined faces 26 on the fixture. Thereafter continued upward movement of transfer bars 30 serves to not only raise the pallet but to also displace it to the left. Since the inclination of faces 32,38 and faces 26,28 with respect to the vertical is greater than the inclination of surfaces 22,24, surface 22 on the angular gib 20 moves upwardly and to the left away from face 24 and, thus, interference between the pallet and the fixture is prevented. As shown in FIG. 3, when the transfer bars 30 are in the fully raised position, the inclined faces 26,28 and the inclined surfaces 22,24 are spaced vertically and laterally apart.

After the transfer bars have been fully raised, cylinder 86 is actuated through its forward stroke to transfer the pallets to the next successive stations. Thereafter, cylinder 78 is actuated to retract power bar 80 to lower the pallets. After the transfer bars are lowered a slight distance the inclined face 28 on the under side of the pallet engages the inclined faces 26 on the fixture. As the transfer bars continue to lower the pallet is shifted downwardly and toward the right by reason of the sliding engagement of surfaces 26,28 and surfaces 32,38. This causes the inclined surface 22 on the angular gib 20 to approach the inclined surface 24 on the fixture. Just prior to the transfer bars 30 reaching their fully lowered position illustrated in FIG. 1, the locating surfaces 16 on the pallet engage the locating surfaces 18 on the fixture to arrest the lowering movement of the pallet. At this time pallet 12 is in a position displaced slightly to the left as compared with its position shown in FIG. 1 and surfaces 26,28, as well as surfaces 32,38, are still interengaged. When the transfer bars are in the fully lowered position, cylinders 56 and 72 are actuated to actuate their respective clamp 44,64. As mentioned previously, clamps 44 are pivoted clockwise as viewed in FIG. 1 so that the nose portions 48 thereof engage the inclined surface 42 and displace the pallet in a direction laterally toward the right to thereby interengage surfaces 22,24. This shifts the pallet slightly to the right to its finally located position and firmly clamps it downwardly on the surfaces 18. Approximately simultaneously therewith clamp 64 engages the shoulder 88 on one of the slots 60 so that the pallet is displaced slightly longitudinally to interengage shoulder 90 with stop key 62 and thereby precisely locate the pallet in a longitudinal direction. Sliding contact of the locating surfaces 16,18 is, thus, maintained at a minimum. In this manner the pallet is located very precisely along its three axes of movement.

Figure 8:
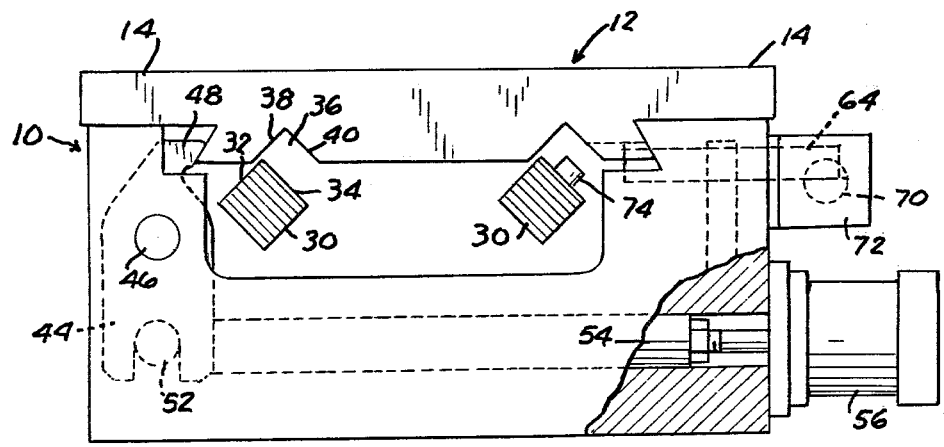
FIG. 8 is a view similar to FIG. 1 and showing a modified form of the invention.
Figure 9:
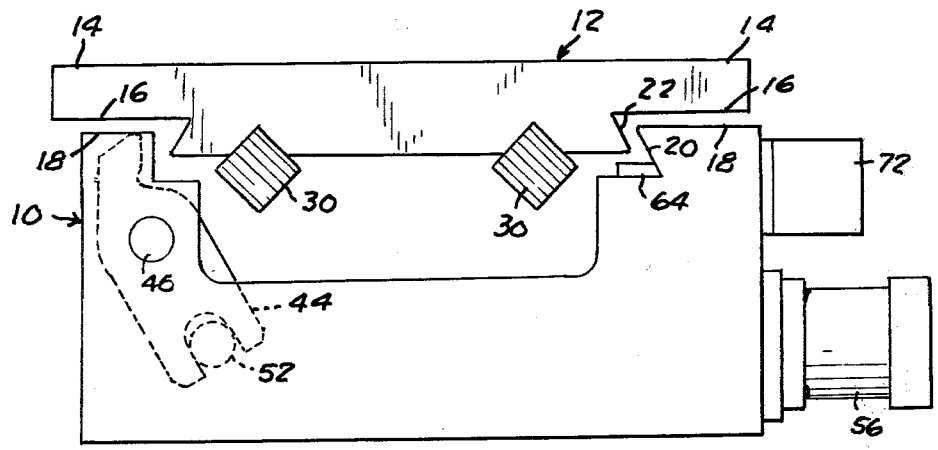
FIG. 9 is similar to FIG. 8 and shows the pallet in the fully raised position.

The arrangement shown in FIGS. 8 and 9 differs only slightly from that illustrated in FIGS. 1 through 5. In the embodiment illustrated in FIGS. 8 and 9 the pallet is shifted laterally a slightly greater extent than in the embodiment illustrated in FIGS. 1 through 5 when the locating surfaces are in coplanar engagement. This difference results from the fact that in the embodiment illustrated in FIGS. 8 and 9 the inclined surfaces 26,28 on the previously described fixture and pallet respectively are omitted. When these surfaces are omitted and the transfer bars 30 are lowered, the pallet is lowered in a strictly vertical direction until the locating surfaces 16 on the pallet engage the locating surfaces 18 on the fixture. The lateral movement of the pallet for the purpose of firmly engaging surfaces 22,24 is obtained exclusively by the actuation of clamps 44. In the embodiment illustrated in FIGS. 8 and 9, when the transfer bars are raised to lift a pallet the pallet is initially moved only laterally on the surfaces 18 until such time as the angled faces 32,34 of the transfer bars come into full engagement with the angled faces 38,40 of the notches 36. Thereafter, the pallet is raised in a strictly vertical direction.

I claim:

1. A mechanism for indexing workpieces to successive stations and for locating and clamping the workpieces at precise locations at the stations comprising:
   (a) a pallet on which the workpiece is adapted to be fixedly mounted and having a pair of laterally spaced, downwardly facing, flat locating surfaces thereon;
   (b) a fixture at each station having a pair of upwardly facing flat locating surfaces thereon adapted to be vertically abutted by the locating surfaces on the pallet to support and locate the pallet in a precise horizontal plane;
   (c) a pair of laterally spaced transfer bars extending longitudinally through the successive stations;
   (d) means for raising and lowering the transfer bars to lift and lower the pallet;
   (e) means for reciprocating the transfer bars longitudinally for advancing the pallet through successive stations;
   (f) said pallet and fixture having inclined, interengageable surface means thereon;
   (g) clamp means on the fixture engageable with the pallet for shifting the pallet laterally in one direction after the transfer bars are lowered and the pallet is deposited on the locating surfaces of the fixture to interengage said inclined surface means on the pallet and fixture, said inclined surface means being adapted, when the pallet is shifted laterally in said one direction, to engage and draw the pallet downwardly against the fixture so as to bring the locating surfaces on the pallet into firm coplanar relation with the locating surfaces on the fixture;
   (h) said transfer bars and pallet having means thereon interengageable when the transfer bars are raised to lift the pallet and displace it laterally in a direction opposite to said one direction.

2. A mechanism as called for in claim 1 wherein said inclined surface means on the pallet and fixture comprises a flat face on one of said pallet and fixture extending longitudinally thereof and inclined to the vertical upwardly in said opposite direction and a surface on the other of said pallet and fixture engageable with said inclined face.

3. A mechanism as called for in claim 1 wherein the inclined surface means on the pallet and fixture comprises parallel flat faces on said fixture and pallet extending longitudinally thereof and inclined to the vertical upwardly and in said opposite direction.

4. A mechanism as called for in claim 3 wherein the means on the under side of the pallet engageable with the transfer bars and adapted to displace the pallet laterally in said opposite direction when the transfer bars are raised such that the flat inclined face on the pallet is displaced laterally away from the flat inclined face on the fixture sufficiently to avoid interference contact between said inclined faces when the pallet is raised.

5. A mechanism as called for in claim 2 wherein the interengageable means on the pallet and transfer bars comprise flat faces which are inclined upwardly and laterally in said one direction.

6. A mechanism as called for in claim 5 wherein said last-mentioned flat faces are inclined to the vertical at a greater angle than the first-mentioned inclined face.

7. A mechanism as called for in claim 2 wherein said interengaging means on said pallet and transfer bars comprise a flat face on the upper side of each transfer bar extending longitudinally thereof and inclined upwardly in said one direction and a pair of similarly inclined flat faces on the under side of the pallet, the lower edge portions of said inclined faces on the pallet overlying the upper edge portions of the inclined faces on the transfer bars when the pallet is displaced in said one direction, whereby, when the transfer bars are raised, the interengaging inclined faces on the pallet and transfer bars displace the pallet laterally in said opposite direction.

8. A mechanism as called for in claim 7 wherein the interengageable flat faces on the pallet and transfer bars are inclined to the vertical at an angle greater than said first-mentioned inclined face.

9. A mechanism as called for in claim 2 wherein said pallet and fixture have additional flat faces correspondingly inclined to the vertical upwardly and laterally in said opposite direction, said last-mentioned flat faces being adapted to interengage and displace the pallet laterally in said one direction when the pallet is lowered by the transfer bars.

10. A mechanism as called for in claim 9 wherein said interengaging means on said pallet and transfer bars comprise an upwardly facing flat face on each transfer bar extending longitudinally thereof and inclined upwardly in said one direction and a pair of similarly inclined, downwardly facing, flat faces on the under side of the pallet, the lower edge portions of said last-mentioned inclined faces on the pallet being disposed vertically above the upper edge portions of the inclined faces on the transfer bars when the pallet is displaced in said one direction, whereby, when the transfer bars are raised, the interengaging inclined faces on the pallet and transfer bars displace the pallet laterally in said opposite direction, the interengaging inclined faces on the transfer bars and pallet and said additional interengaging inclined faces on the pallet and fixture being oppositely inclined to the vertical to the same extent.

11. A mechanism as called for in claim 2 wherein said pallet has a longitudinally extending face thereon which is inclined to the vertical upwardly and laterally in said one direction, said clamp means when actuated engaging said surface to shift the pallet laterally in said opposite direction and exerting a downward force on the pallet.

12. A mechanism as called for in claim 11 wherein said clamp means comprises a lever pivoted on said fixture for rotation about a horizontal axis entending longitudinally of the fixture.

13. A mechanism as called for in claim 2 wherein said pallet and fixture have a pair of laterally extending opposed stop surfaces thereon which are interengageable to locate the pallet in a precise longitudinal position on said fixture and clamp means on the fixture for displacing the pallet longitudinally to interengage said stop surfaces.

14. A mechanism as called for in claim 13 including means on said transfer bars engageable with the pallets for locating the pallets longitudinally of the transfer bars, said last-mentioned means being disengaged from the pallets when the transfer bars are lowered to deposit the pallet on the fixture.

* * * * *